(12) United States Patent
Bazin et al.

(10) Patent No.: US 7,313,183 B2
(45) Date of Patent: Dec. 25, 2007

(54) REAL TIME SCENE CHANGE DETECTION IN VIDEO SEQUENCES

(75) Inventors: Benoit F. Bazin, Milpitas, CA (US); Cecile M. Foret, Mountain View, CA (US)

(73) Assignee: LSI Corporation, Milpitas, CA (US)

( * ) Notice: Subject to any disclaimer, the term of this patent is extended or adjusted under 35 U.S.C. 154(b) by 944 days.

(21) Appl. No.: 10/603,009

(22) Filed: Jun. 24, 2003

(65) Prior Publication Data

US 2004/0264788 A1   Dec. 30, 2004

(51) Int. Cl.
*H04N 7/12* (2006.01)
*H04N 11/02* (2006.01)
*H04N 11/04* (2006.01)
*H04B 1/66* (2006.01)

(52) U.S. Cl. ............................... 375/240.01
(58) Field of Classification Search .................. None
See application file for complete search history.

(56) References Cited

U.S. PATENT DOCUMENTS

| | | | |
|---|---|---|---|
| 4,689,672 A * | 8/1987 | Furukawa et al. | 375/240.12 |
| 5,404,174 A | 4/1995 | Sugahara | |
| 5,493,345 A | 2/1996 | Ishikawa et al. | |
| 5,589,884 A | 12/1996 | Ohguchi | |
| 5,592,226 A * | 1/1997 | Lee et al. | 375/240.14 |
| 5,617,149 A * | 4/1997 | Lee et al. | 348/699 |
| 5,642,174 A | 6/1997 | Kazui et al. | |
| 5,732,146 A | 3/1998 | Yamada et al. | |
| 5,774,593 A | 6/1998 | Zick et al. | |
| 5,880,775 A | 3/1999 | Ross | |
| 6,014,183 A | 1/2000 | Hoang | |
| 6,025,886 A | 2/2000 | Koda | |
| 6,977,963 B1 * | 12/2005 | Shiiyama | 375/240.24 |
| 7,110,452 B2 * | 9/2006 | Katsavounidis et al. | 375/240.08 |
| 2004/0131117 A1 * | 7/2004 | Sheraizin et al. | 375/240.12 |

* cited by examiner

*Primary Examiner*—Nhon Diep
(74) *Attorney, Agent, or Firm*—Christopher P. Maiorana PC

(57) ABSTRACT

An apparatus configured to process a digital video signal comprising an input circuit, a processing circuit and an encoder circuit. The input circuit may be configured to present a digital video signal comprising a plurality of frames. The processing circuit may be configured to detect scene changes in the digital video signal by analyzing (i) a current one of the plurality of frames and (ii) two or more other frames. The encoder circuit may be configured to generate an encoded signal in response to the digital video signal and the scene changes.

13 Claims, 7 Drawing Sheets

REAL TIME SCENE CHANGE DETECTION IN VIDEO SEQUENCES

FIELD OF THE INVENTION

The present invention relates to processing digital video generally and, more particularly, to a real time scene change detection in video sequences.

BACKGROUND OF THE INVENTION

Conventional approaches for detecting scene changes analyze the recorded bitstream. Such analysis may use the results of a discrete cosine transform (DCT) or the particular type of macroblock. Such conventional approaches are discussed in (i) U.S. Pat. No. 5,774,593 entitled "Automatic scene decomposition and optimization of MPEG compressed video", (ii) U.S. Pat. No. 5,493,345 entitled "Method for detecting a scene change and image editing apparatus", and (iii) U.S. Pat. No. 5,642,174 entitled "Scene change detecting device". Such conventional approaches do not detect scene changes before encoding the current frame, but rather provide post-recording scene change detection.

Other conventional approaches are based on the variation of statistics related to the video sequence. Different types of statistics are used, but such approaches base the detection of a scene change on the variation of that statistic from one frame to the other, usually by comparing the difference of statistics to a threshold.

Such approaches are discussed in U.S. Pat. No. 5,404,174, entitled "Scene change detector for detecting a scene change of a moving picture". This method compares the frame activity from one frame to the other. Another approach is presented in U.S. Pat. No. 5,732,146, entitled "Scene change detecting method for video and movie". This method compares the value of a histogram from one frame to the other. Another approach is discussed in U.S. Pat. No. 5,990,980, entitled "Detection of transitions in video sequences". This method introduces a dissimilarity measure based on the difference of histograms between consecutive frames. Another approach is discussed in U.S. Pat. No. 5,617,149, entitled "Apparatus an method for detecting scene changes using the difference of MAD between image frames". This method detects scene changes when the variation of the frame based DC value is bigger than a set threshold. Another approach is discussed in U.S. Pat. No. 5,589,884, entitled "Adaptive quantization controlled by scene change detection". This method detects scene changes using a pixel based variation of DC between two consecutive frames. Another approach is discussed in U.S. Pat. No. 6,014,183, entitled "Method and apparatus for detecting scene changes in a digital video stream". This methods compares pixel colors from one frame to the next frame to detect scene changes. Each of these approaches is based on a first order of derivation of the statistics used (i.e., DC, histogram, activity, etc.), and are fairly prone to invalid scene change detection.

Referring to FIG. 1, a diagram illustrating a conventional sequence of scene changes is shown. Clear discontinuities are shown as a transition 10 and a transition 12. The discontinuities between scenes (i.e., the transition 10 between a SCENE1 and a SCENE2 and the transition 12 between the SCENE2 and the SCENE3) are clear when monitoring the sequence.

Referring to FIG. 2, a diagram illustrating a conventional scene change and a fade out is shown. The discontinuities are shown at a transition 20 and a transition 22. The signal INPUT' represents a first order derivative of the signal INPUT. The signal INPUT" illustrates a second order derivative of the signal INPUT.

Referring to FIG. 3, a diagram illustrating a conventional scene change is shown. A first direction 30 illustrates a transition between a SCENE1 and a SCENE2. A second direction 32 illustrates a transition from the SCENE2 to the SCENE1. The transition has different characteristics in the direction 30 than in the direction 32. Conventional approaches only analyze the signal INPUT(T) in either the direction 30 from one direction than from the other direction.

Referring to FIG. 4, a diagram illustrating three conventional scene change cases is shown. Case 1 represents a scene change from a relatively fixed input value to a relatively fixed value. Case 2 illustrates a transition from a variable input value (i.e., scene 1) to a relatively fixed input value (i.e., scene 2). Case 3 illustrates a relatively fixed input value (i.e., scene 1) to a variable input value (i.e., scene 2).

It would be desirable to detect scene changes within a video sequence that (i) distinguishes between fades and discontinuities, (ii) selects a processing direction to minimize processing needs and/or (iii) processes while recording the video sequence.

SUMMARY OF THE INVENTION

The present invention concerns an apparatus configured to process a digital video signal comprising an input circuit, a processing circuit and an encoder circuit. The input circuit may be configured to present a digital video signal comprising a plurality of frames. The processing circuit may be configured to detect scene changes in the digital video signal by analyzing (i) a current one of the plurality of frames and (ii) two or more other frames. The encoder circuit may be configured to generate an encoded signal in response to the digital video signal and the scene changes.

The objects, features and advantages of the present invention include providing real time scene change detection in a video sequence that may (i) provide scene change information to a rate control circuit, (ii) adjust a bit budget for each frame, (iii) change the picture type before recording to achieve better general recording quality, (iv) detect scene cuts within the video sequence, but avoid detecting fades-in and fades-out that may need to be handled in a different manner and/or (v) index various existing scenes within a video sequence be used within the context of video editing.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be used to detect scene change in a video sequence. The present invention may be used to take advantage of historic statistics within a scene in a digital video signal to reduce the processing needed for encoding the video signal. Statistics within the video signal may be used to characterize a particular scene to distinguish one scene from another scene. The statistics may be used to distinguish a first type, of transition (e.g., a real scene cut) from a second type of transition (e.g., a fade). The applications for the present invention may range from navigation purposes to encoder quality improvement.

Figure 5:
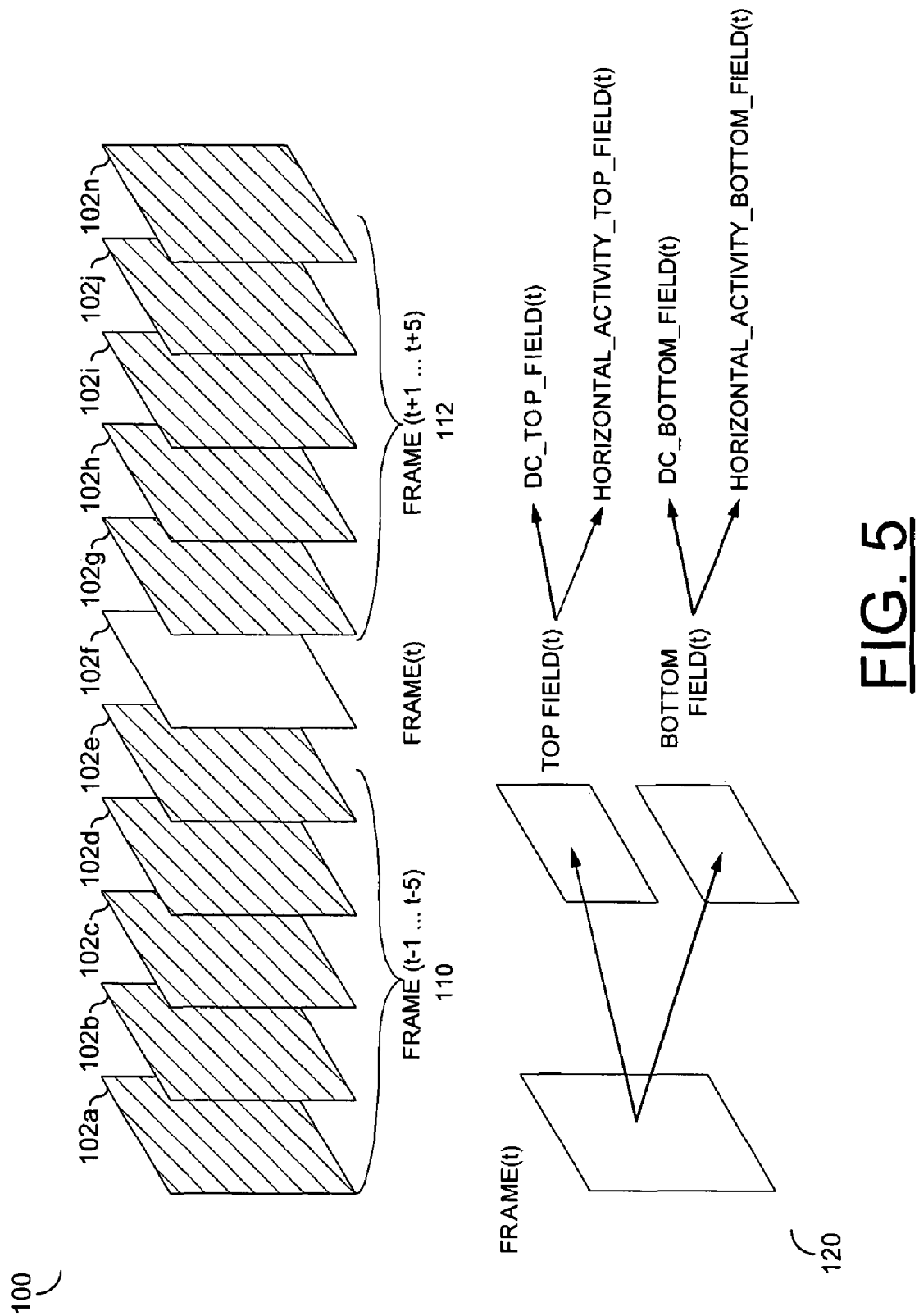
FIG. 5 is a diagram illustrating a window of frames.

Referring to FIG. 5, a diagram illustrating a portion of a video signal in accordance with a preferred embodiment of the present invention is shown. A portion 100 illustrates a window of frames 102a-102n, where n is an integer. The frames 102a-102n may represent frames within digitized video signal. The digitized video signal may be either an interlaced signal or a progressive signal. In general, each of the frames 102a-102n represents 1/30 of a second. However, the particular number of frames per second may be adjusted to meet the design criteria of a particular implementation. For example, a film based video signal may have 24 frames per second.

The frame 102f may also be referred to in a time-based sense as frame (t). The particular number of the frames 102a-102n used before or after the frame 102f may be a window. A window 110 may be defined as a number of frames 102a-102n (e.g., frames 102a-102e). The number of frames in the window 110 may be programmable. The window 110 may also be defined in a time-based sense as the frames (t−1 . . . t−5). A window 112 may be defined as the frames 102g-102n. The number of frames in the window 112 may be programmable. The window 112 may also be defined in a time-based sense as the frames t+1 . . . t+5.

A portion 120 illustrates a definition of terms within a frame. For example, the frame(t) is shown broken into a first field (e.g., TOP_FIELD(t)) and a second field (e.g., BOTTOM_FIELD(t)). The field TOP_FIELD(t) generally comprises a parameter (e.g., DC_TOP_FIELD(t)) and a parameter (e.g., HORIZONTAL_ACTIVITY_TOP_FIELD(t). The field BOTTOM_FIELD (t) generally comprises a parameter (e.g., DC_BOTTOM_FIELD(t) and a parameter (e.g., HORIZONTAL_ACTIVITY_BOTTOM_FIELD(t). The parameters may be used to process the frame (t) (to be described in detail in connection with FIGS. 6-11). The parameters may also be referred to as field measure parameters.

Figure 6:
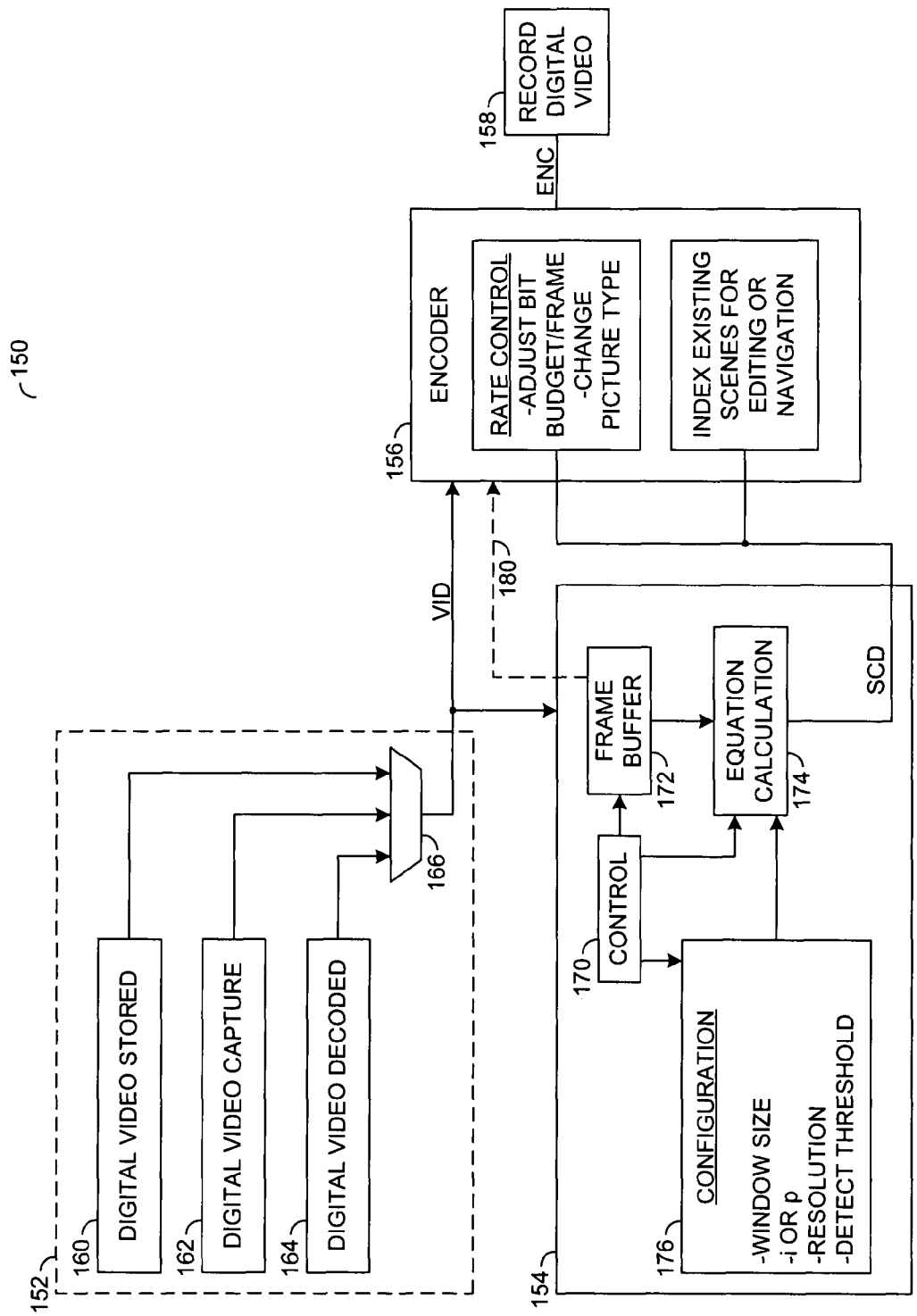
FIG. 6 is a diagram illustrating scene changes in accordance with a preferred embodiment of the present invention.

Referring to FIG. 6, a block diagram of a system 150 is shown. The system 150 may be used to detect scene changes in a video signal. The system 150 generally comprises an input section (or circuit) 152, a processing section (or circuit) 154, an encoding section (or circuit) 156 and a recording section (or circuit) 158. The various components of the present invention are described as blocks, sections and/or circuits. However, the various components may be implemented in hardware, software or a combination of hardware and software. Software may be used to describe firmware, VHDL code, etc.

The input section 152 generally comprises a stored digital video section 160, a digital video capture section 162, a decoded digital video section 164 and a multiplexer 166. The section 160 may present a signal stored on a hard-disk or other storage system. The digital video capture section 162 may be used to digitize an analog video source. The decoded digital video section 164 may present a signal from a video decoder. The multiplexer 166 may present one of the video sources 160, 162 and 164 to the processing section as a video signal (e.g., VID). The signal VID may be either a progressive scan signal or an interlaced signal. The processing section 154 may be implemented as a scene detect block (or circuit).

The processing block 154 generally comprises a control block (or circuit) 170, a frame buffer block (or circuit) 172, an equation calculation block (or circuit) 174 and a configuration block (or circuit) 176. The frame buffer 172 generally holds the necessary digitized frames needed for equation processing. The frame buffer 172 may also hold a subset of the frames 102a-102n if the field measure parameters are available for the specific frame. For example, if the system 150 needs a scene change detect as soon as available, the soonest the scene change detect can be available is within 1/30th of the time (in a 30 frame per second implementation) after the current frame, when moving forward through the frames 102a-102n. When moving backwards- through the frames 102a-102n, information from the previous frames may be needed. For example, if information from the previous 5 frames 102a-102n is needed, then five 1/30th intervals may be needed. The system 150 may delay the frames sent to the encoder 156 to allow the scene change detect to arrive at or before the particular one of the frames 102a-102n that represents the scene change. Such a latency may be introduced by holding or buffering the frames 102a-102n presented to the encoder 156. For example, if the encoder 156 benefits from the scene change detect signal SCD arriving at the same time as the particular one of the frames 102a-102n that represents the scene change detect, a single frame would be buffered before being presented to the encoder 156 through the path 180. The path 180 may be an optional path from the frame buffer 172 to the encoder 156.

The equation calculation block 174 generally calculates the field measure parameters from each of the frames 102a-102n and executes each of the equations needed to assess scene change. The configuration block 176 may be used to configure the scene change detect function with one or more parameters. Such parameters may include window size (e.g., the number of frames prior to and after the current frame), a detect threshold (e.g., the level of indicator values that will cause a scene change detect) or other parameters. The encoder 156 may receive an input from either the multiplexer 166 or the processing circuit 154. The encoder 156 may benefit from the scene change detect in terms of optimizing rate control by adjusting the bit budget per frame and/or changing the picture type. The encoder 156 may also benefit from the processing circuit in terms of enabling and indexing existing scenes for editing, navigation and/or other applications.

The recording section 158 is generally an optional section configured to store the encoded video (e.g., ENC) presented by the encoder circuit 156. Additional features, such as transporting the encoded signal ENC, may also be implemented. Additionally, the encoder 156 may be bypassed if needed. In particular, the signal VID may be directly recorded by the recording section 158. In such a configuration, the signal VID may be edited or navigated with detect scene change information represented as sideband information.

Figure 7:
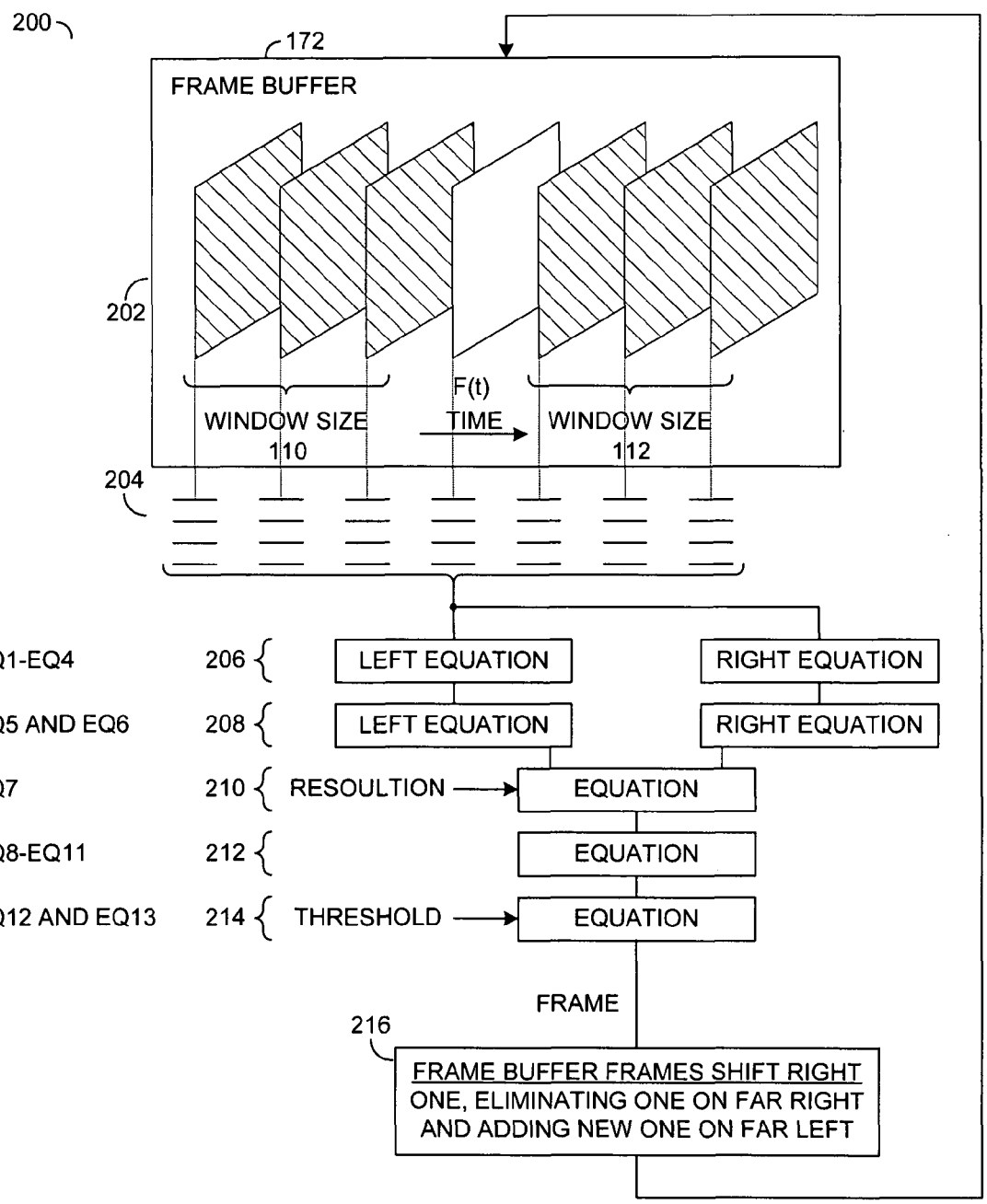
FIG. 7 is a diagram of a process illustrating a scene changes detect process in accordance with the present invention.

Referring to FIG. 7, a diagram of a method (or process) 200 illustrating scene change detection in accordance with a preferred embodiment of the present invention is shown. The method 200 generally comprises a step 202, a step 204, a step 206, a step 208, a step 210, a step 212, a step 214, and a step 216. The step 204 generally calculates the field measures. The step 206 generally calculates the second order derivatives. The step 208 generally calculates the averages of the second order derivatives. The step 210 calculates statistical variations compared to the calculated averages from step 208. The step 212 generally calculates scene change indicators. The step 214 generally checks if a scene change has occurred between two distinct frames 102a-102n or in the middle of one of the frames 102a-102n.

The frame buffer 172 may be implemented as a memory configured to store the frames 102a-102n. The frame buffer 172 may also store relevant frame information that may be used by the equations section 174. In the step 204, the field measure parameters may be calculated on each of the frames 102a-102n. The field measure parameters may be used by the equation calculation block 174. A configuration parameter (e.g., RESOLUTION) may be used by the step 210. A configuration parameter (e.g., THRESHOLD) may be used by the step 214. In the step 216, if a particular one of the frames 102a-102n is no longer needed, the particular frame is generally shifted out and another one of the frames 102a-102n is generally shifted in.

The present invention generally uses two field measure parameters. The DC parameters generally represent a sum of the color corrected luma pel. The horizontal activity generally represents a sum of the absolute differences between horizontally adjacent color corrected luma pels. If a scene change occurred on the frame(t), the system 150 has access to the frames t−window-size to, t+widow-size measure parameters. In one example, a window-size of five may be assigned. To simplify the following equations, the following definitions may be used:

input[0](t)=DC_Top_Field(t)
input[1](t)=DC_Bottom_Field(t)
input[2](t)=Horizontal_Activity_Top_Field(t)
input[3](t)=Horizontal_Activity_Bottom-Field(t)

Some continuous measures during a sequence are generally expected. Discontinuities that may occur on a scene change boundary are generally searched. In general, the present invention is based on a second order derivative of the frames 102a-102n.

A scene change may be seen in two ways (e.g., a scene change from SCENE1 to SCENE2 or from SCENE2 to SCENE1). In some cases, a scene change is more obvious from one point of view. To perform the scene change detection, a second order derivative of the input[ ](t) may be implemented. A scene change may be checked from SCENE1 to SCENE2, using a left second order derivative and vice versa. Such derivatives may be implemented in the equation block 174. The following equations illustrate such derivatives:

left first order derivative input'$_l$[i](t)=input[i](t)−input [i](t−1)  EQ1 right first order derivative input'$_r$[i](t)=input [i](t+1)−input[i](t)  EQ2 left second order derivative input''$_l$[i](t)=input'$_l$[i](t)−input'$_l$[i](t−1)  EQ3 right second order derivative input''$_r$[i](t)=input'$_r$[i](t+1)−input'$_r$[i](t)  EQ4 i ∈ {0, 1, 2, 3}

Figure 1:
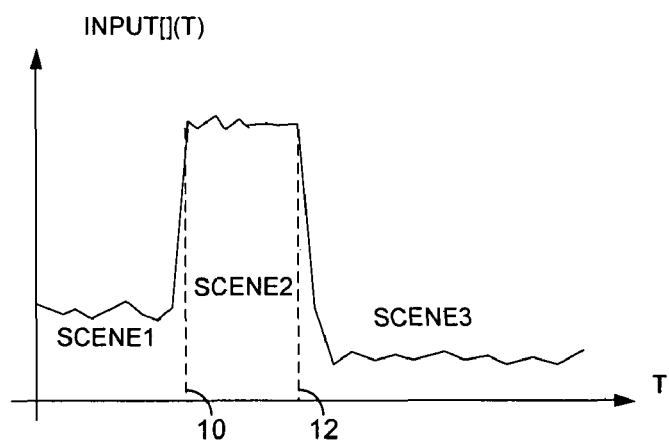
FIG. 1 is a diagram illustrating conventional scene changes with clear discontinuities.
Figure 2:
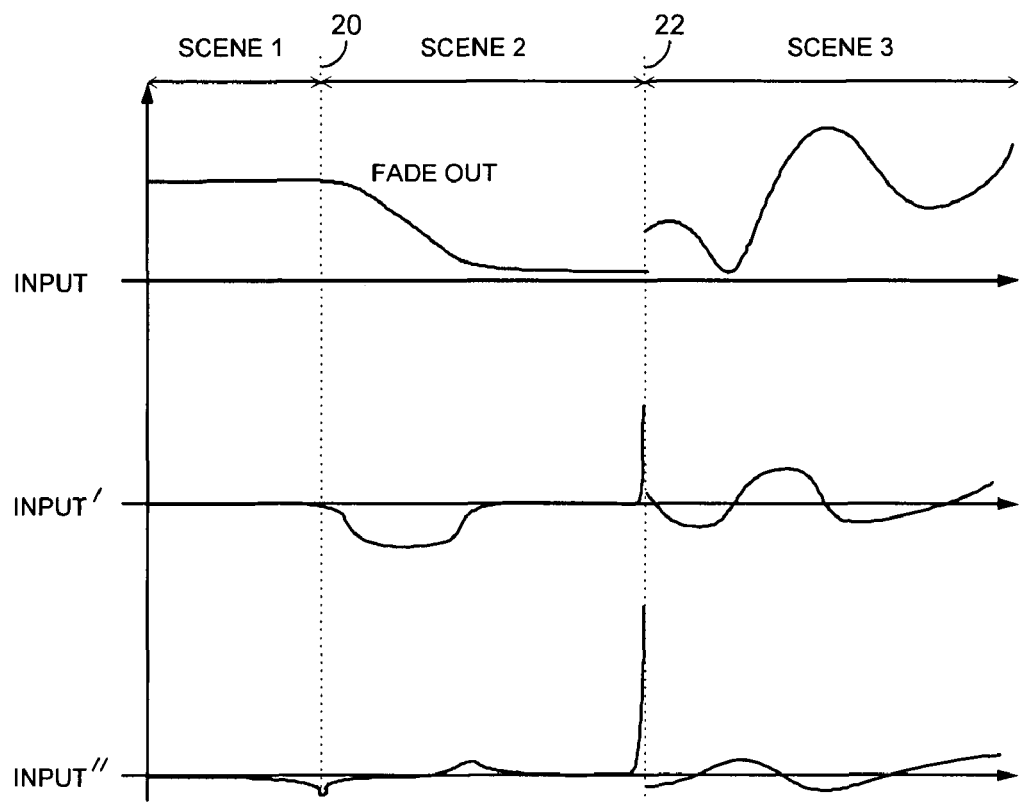
FIG. 2 is a diagram illustrating conventional scene changes with a fade out.
Figure 3:
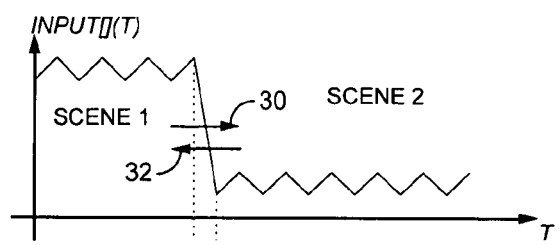
FIG. 3 is a diagram illustrating conventional scene change where detection has different characteristics depending on the direction.
Figure 4:
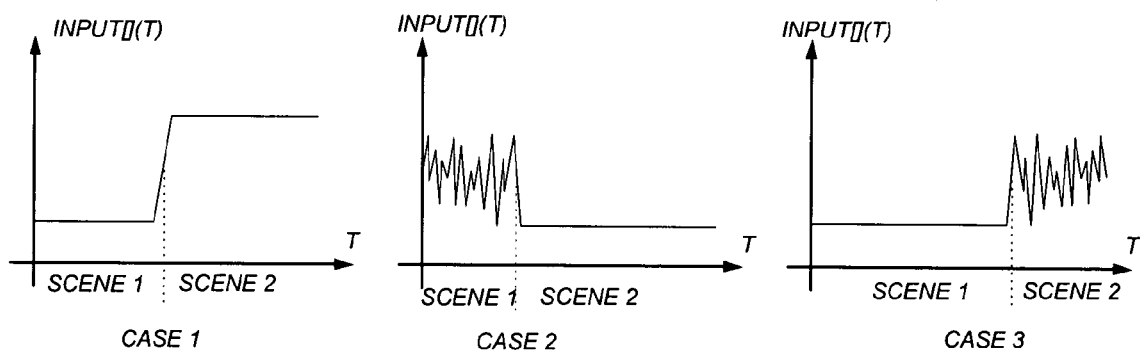
FIG. 4 is a block diagram illustrating three conventional scene change cases.

Three major scene change may be present (as shown in FIG. 4). In typical case 1, both approaches generally have a large increase of the second order derivative. In the typical case 2, a large increase of input'$_r$[ ] (t) from SCENE2 to SCENE1 may be present, but no increase of input''$_l$[ ] (t) from SCENE1 to SCENE2. In the typical case 3, a large increase of input''$_l$[ ] (t) from SCENE1 to SCENE2 may be present, but no increase of input''$_r$[ ](t) from SCENE2 to SCENE1.

The present invention generally isolates the increases/variations of the second order variations. The following equations quantify such variations:

$$\text{average } r[i](t) = \frac{\sum_{j=0}^{2} |\text{input}''r[i](t+j)|}{3} r \quad \text{EQ5}$$

$$\text{average } l[i](t) = \frac{\sum_{j=1}^{3} |\text{input}''l[i](t-j)|}{3} \quad \text{EQ6}$$

$$\text{variation } [i](t) = \frac{|\text{input}''r[i](t-1)|}{cst[i] + \text{average}[i](t)} + \frac{|\text{input}''l[i](t)|}{cst[i] + \text{average}[i](t)} \quad \text{EQ7}$$

ie {0, 1, 2, 3}

In general, cst[i] is a constant defined as a function of the resolution and the input type (e.g., DC or Activity). The constant cst[i] should roughly give an estimation of what background variation level is expected. The higher the constant cst[i], the less the present invention will be sensitive to incorrect detection in case of a very static video sequence. However, the present invention may be less sensitive to some subtle scene changes.

Instead of checking each result independently, the system 150 combines all of the results and normalizes the result. If all the different variations cannot pinpoint a scene change when they are analyzed independently, an analysis of the aggregate may indicate that a scene change occurred. Such aggregate analysis may allow detection of less obvious scene change. An aggregate analysis may also allow analysis without being overly sensitive to each individual variation.

Combining data contemplates different possible scene change configurations. A scene change can occur between 2 frames, but may also occur between the top and the bottom field of a particular frame 102a-102n (e.g., in a top field first configuration, and vice versa for a bottom field first configuration).

Scene change detection from the top and bottom field point of view does not generally occur at the same time. If the scene change occurs between two of the frames 102a-102n, the variation appears at the same time from the top and bottom field point of view. If the scene change occurs in the middle of a frame, then the variation appears one frame earlier for the bottom field inputs in a Top Field First configuration (and vice versa in a bottom field first configuration).

Scene change indicators between the frames 102a-102n may be defined by the following equations:

$$Frame1Indicator = \frac{variation[0](t) + variation[2](t)}{4} \quad \text{EQ8}$$

$$Frame2Indicator = \frac{variation[1](t) + variation[3](t)}{4} \quad \text{EQ9}$$

Scene change indicators in a particular one of the frames 102a-102n may be defined by the following equations:

$$Field1Indicator = \frac{variation[0](t+1) + variation[2](t+1)}{4} \quad \text{EQ10}$$

$$Field2Indicator = \frac{variation[1](t) + variation[3](t)}{4} \quad \text{EQ11}$$

The following equations represent a final output:

((Frame1Indicator+Frame2Indicator)>=Threshold
&& (2*min(Frame1Indicator, Frame2Indicator)>=max(Frame1Indicator, Frame2Indicator))    EQ12

((Field1Indicator+Field2Indicator)>=Threshold &&
(2*min(Field1Indicator, Field2Indicator>=max
(Field1Indicator, Field2Indicator))    EQ13

The equations EQ12 and EQ13 return a boolean output. If the equation EQ12 is true, then a scene change has been detected between frame (t) and the frame (t−1). If the equation EQ13 is true, then a scene change has been detected between the two fields of the frame (t). The equations EQ12 and EQ13 also check that a scene change is noticeable on the two distinct fields.

A value for the threshold in step 214 defines the sensitivity of the method 200. The larger the value of the threshold, the more scene change will be missed. The smaller the value of the threshold, the more incorrect scene change will be detected.

Figure 8:
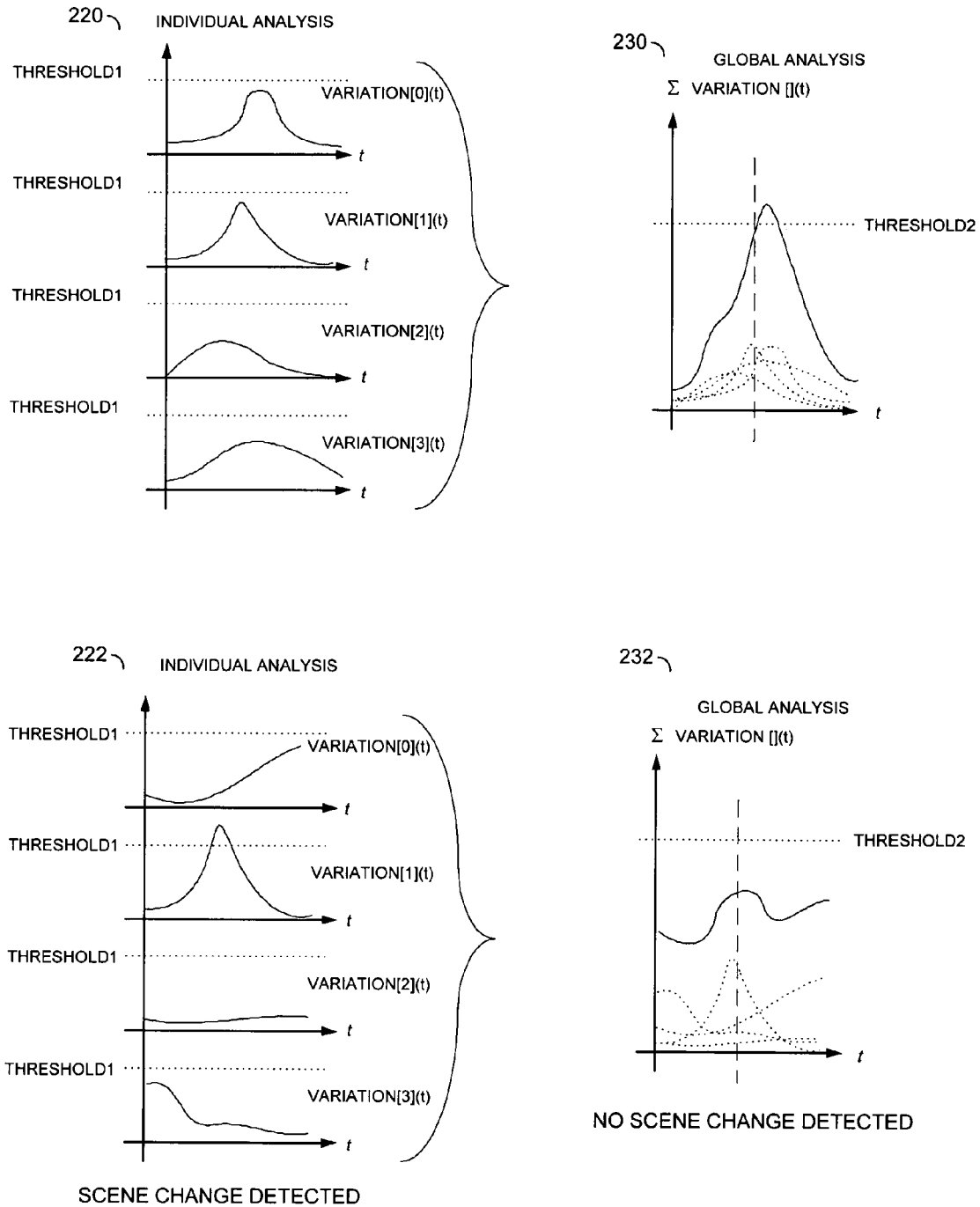
FIG. 8 is a block diagram illustrating the blending of variations between frames.

Referring to FIG. 8, a diagram illustrating the blending of variations between the frames 102a-102n is shown. The variations between window frames before and after the frame(t) may be blended and normalized based on a second order derivative equation. For example, the second order derivative equation may allow the detection of less obvious scene changes. The equation EQ7 may be used to calculate the variation, which may process absolute input values relative to an average. The results of the variation equations are shown in the graphs 220 and 222. A global analysis is shown in the graphs 230 and 232. The results may be presented to the indicator equations EQ8, EQ9, EQ10 and EQ11. The result of the aggregate variation (e.g., the sum of processed deltas) may be compared to a threshold as in equations EQ12 and EQ13.

Figure 9:
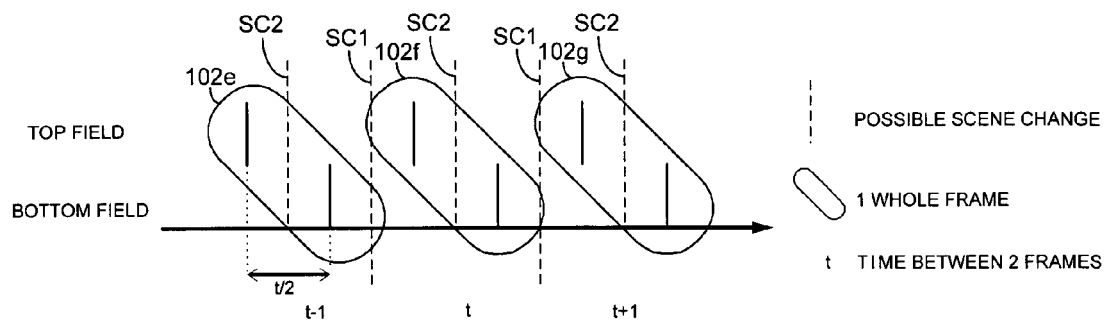
FIG. 9 is a block diagram illustrating possible scene change relative to the time between frames.
Figure 10:
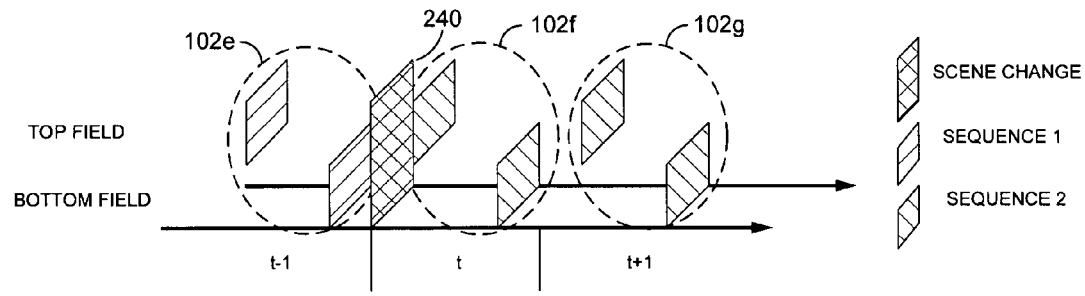
FIG. 10 is a block diagram illustrating a scene change between two frames.
Figure 11:
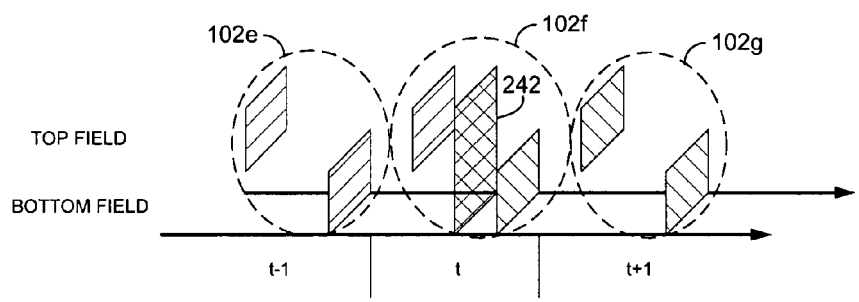
FIG. 11 is a block diagram illustrating a scene change occurrence between the top and the bottom field of the same frame.

Referring to FIGS. 9, 10, and 11, a diagram illustrating the frames 102e, 102f and 102g is shown. Each of the frames 102e, 102f and 102g comprises a top field and a bottom field. A top field first configuration may be shown. The top field may be available in time before the bottom field on all frames. The frame 102f may represent a frame occurring at a time t. The frame 102e may represent a frame occurring at a time t−1 (e.g., one time slot before the time t). The frame 102g may represent a frame occurring at a time t+1 (e.g., one time slot after the time t).

In FIG. 9, a diagram illustrating possible scene change SC1 and SC2 is shown. The scene changes SC1 occur at the time between frames. For example, the scene changes SC1 may occur between the frames 102e, 102f or 102g. The scene changes SC2 may occur between the top and bottom field of a particular one of the frames 102e, 102f or 102g.

In FIG. 10, a scene change occurrence 240 between the frame 102e and the frame 102f is shown. The scene change 240 may first be represented in the top field of the frame 102f. The indicator equations EQ8 and EQ9 may be used to process such a scene change.

In FIG. 11, a scene change 242 is shown occurring at a time between the top and bottom field of the frame 102f. The scene change 242 may first be represented in the digital video bottom field of the frame 102f. The scene change 242 may then be represented in the digital video top field of the frame 102g. In this case, the indicator equations EQ10 and EQ11 may be used to blend the variations in a way that provides appropriate sensitivity to the scene change detect mechanism.

While the invention has been particularly shown and described with reference to the preferred embodiments thereof, it will be understood by those skilled in the art that various changes in form and details may be made without departing from the spirit and scope of the invention.

The invention claimed is:

1. An apparatus configured to process a digital video signal comprising:
    an input circuit configured to present a digital video signal comprising a plurality of frames;
    a processing circuit configured to detect scene changes in said digital video signal by analyzing (i) a current one of said plurality of frames and (ii) two or more other frames; and
    an encoder circuit configured to generate an encoded signal in response to said digital video signal and said scene changes, wherein (a) said two or more other frames comprise (i) a first window of frames that are processed before said current frame and (ii) a second window of frames that are processed after said current frame and (b) (i) said first window comprises a first fixed number of frames that are processed before said current frame, (ii) said second window comprises a second fixed number of frames that are processed after said current frame and (iii) said processing circuit detects said scene changes by analyzing changes between said first window and said second window.

2. The apparatus according to claim 1, wherein said processing circuit detects said scene changes by analyzing changes between said second window and said first window.

3. The apparatus according to claim 1, further comprising:
    a storage circuit configured to record said encoded signal.

4. The apparatus according to claim 1, wherein said input circuit is configured to generate said digital video signal in response to either (i) a stored signal, (ii) a captured signal, or (iii) a decoded signal.

5. The apparatus according to claim 1, wherein each frame comprises 1/30 of a second.

6. The apparatus according to claim 1, wherein a transition signal comprises information used by said encoder to simplify generating said encoded signal.

7. A method for processing video, comprising the steps of:
(A) receiving a video signal comprising a plurality of frames, wherein said video signal is generated in response to (i) a stored signal, (ii) a captured signal, or (iii) a decoded signal;
(B) (a) generating one or more transition signals in response to (i) a current one of said frames, (ii) one or more frames that are processed before said current frame and (iii) one or more frames that are processed after said current frame, (b) generating field measures in response to said plurality of frames and (c) calculating a second order derivative of a first transition from a first scene to a second scene;
(C) generating an encoded signal in response to (i) said video signal and (ii) said transition signals; and
(D) recording said encoded signal.

8. The method according to claim 7, wherein step (B) further comprises:
calculating a second order derivative of a second transition from a second scene to a first scene.

9. The method according to claim 8, wherein step (B) further comprises:
calculating a first average of said one or more frames that are processed before said current frame.

10. The method according to claim 9, wherein step (B) further comprises:
calculating a second average of said one or more frames that are processed before said current frame.

11. The method according to claim 8, wherein step (B) further comprises:
calculating a statistical variation compared to said first and second averages.

12. The method according to claim 9, wherein step (B) further comprises:
generating a scene change indicator in response to said variation.

13. The method according to claim 7, wherein said transition signals comprise information used by an encoder to simplify generating said encoded signal.

* * * * *